United States Patent [19]

Talgam et al.

[11] Patent Number: 4,903,264
[45] Date of Patent: Feb. 20, 1990

[54] METHOD AND APPARATUS FOR HANDLING OUT OF ORDER EXCEPTIONS IN A PIPELINED DATA UNIT

[75] Inventors: Yoav Talgam, Tel-Aviv, Israel; Mitch K. Alsup, Dripping Springs; Marvin A. Denman, Austin, both of Tex.

[73] Assignee: Motorola, Inc., Schaumburg, Ill.

[21] Appl. No.: 182,551

[22] Filed: Apr. 18, 1988

[51] Int. Cl.⁴ .................................................. G06F 11/00
[52] U.S. Cl. ..................................... 371/16.1; 364/200
[58] Field of Search ....................... 371/12, 16, 16.1; 364/200

[56] References Cited

U.S. PATENT DOCUMENTS

| | | | |
|---|---|---|---|
| 3,736,566 | 5/1973 | Anderson et al. | 364/200 |
| 4,107,773 | 8/1978 | Gilbreath et al. | 364/200 |
| 4,253,183 | 2/1981 | Taylor et al. | 371/16 |
| 4,543,628 | 9/1985 | Fomfret | 364/200 |
| 4,566,063 | 1/1986 | Zolnowsky et al. | 364/200 |
| 4,783,783 | 11/1988 | Nagai et al. | 371/12 |

Primary Examiner—Charles E. Atkinson
Attorney, Agent, or Firm—Robert L. King

[57] ABSTRACT

A pipelined data unit for use in a data processor, the data unit having special input operand check logic for involking a precise exception handling mechanism if either or both of the input operands fails the check, and output result format logic for involking an imprecise exception handling mechanism if the output result cannot be provided in a selected format. Special buffers are also provided to allow the control and status information unique to each instruction to flow through the pipeline together with that instruction. Sufficient information relating to each instruction being executed in the data unit is retained and made readily available to the handlers, so that each type of exception may be handled, should recovery be possible.

13 Claims, 4 Drawing Sheets

FIG. 1 —PRIOR ART—

METHOD AND APPARATUS FOR HANDLING OUT OF ORDER EXCEPTIONS IN A PIPELINED DATA UNIT

TECHNICAL FIELD

This invention relates generally to a pipelined data unit for use in a digital data processor, and, in particular, to a pipelined data unit adapted to handle out of order exceptions.

BACKGROUND ART

In powerful digital data processors, multiple, substantially autonomous data units are commonly employed to allow concurrent or "overlapped" execution of instructions, wherein a different instruction may be simultaneously executing in each of the data units. In simple data units, each instruction may take only a single machine cycle to execute, so that a new instruction may be "issued" to the data unit every machine cycle. In complex data units, several machine cycles may be required to execute an instruction, so that a subsequent instruction for that data unit cannot be issued until the data unit has completed the last instruction issued to it. To minimize the likelihood of such "stalls", the complex data unit may be constructed as a series of relatively independent "stages" which together comprise a "pipeline", such that a different instruction can be concurrently executing at each stage of the pipeline. Both techniques, overlapping and pipelining, allow greater increased performance. However, having paid the price in hardware to enable the higher performance level, considerable additional investment must be made in sophisticated optimizing compilers and scheduling hardware to fully realize the potential performance levels.

In general, some types of exception conditions are detectable at the beginning of execution of an instruction, while other types of exception conditions are only detectable during or after execution. For example, an attempt to divide by zero can be easily detected before execution is initiated, and an appropriate "trap" signal generated. Since the data processor has not yet proceeded to issue the next instruction, the exception can be recognized immediately, before the state of the processor has changed. Such an exception condition is referred to as "precise", since the state of the data processor, including all of the data units, as of the time the trapped instruction was issued is known precisely. Such precise exception handling mechanisms are common in conventional, serial data processors such as the Motorola MC68020 microprocessor. (See, *MC68020 32-Bit Microprocessor User's Manual*, Second Edition, 1985, page 6-10.)

In contrast, an overflow or underflow condition which occurs as a result of an arithmetic operation will typically be detected some time after the issuance of the instruction which caused that condition. Since the data processor will have continued to issue subsequent instructions in the instruction stream, it is possible that at least one of those subsequent instructions will have completed and irreversibly changed the state of the processor. If no sequence of instructions can be executed after the trap to precisely recreate the state of the processor as of the time the trapping instruction was issued, the exception is referred to as "imprecise". Conventional serial data processors, such as the MC68020, are equipped with an imprecise exception handling mechanism. (See, *MC68020 32-Bit Microprocessor User's Manual*, Second Edition, 1985, Appendix A1-A4).

Although many high performance data processors have permitted imprecise exceptions, most did so based on the assumption that a trap implies a fatal error such that the continued correct execution is not necessary. Processors exhibiting such imprecise exception behavior include the IBM System 360 Model 91, the Texas Instruments Advanced Super Computer, the Control Data Corporation 6600, 7600 and Star 100, and the Cray Model 1. In some of these, particularly the CDC processors, the arithmetic algorithms were simply "defined" as being incapable of generating an exception condition and always delivered a result in a predictable form regardless of the situation. In contrast, IEEE compliant floating-point arithmetic requires the recognition of certain exceptional conditions. When the processor itself is incapable of recognizing such "required" exceptions conditions, a complex (and slow) software envelope must be provided to detect the exception copnditions "before" they would otherwise have occurred, and then handle them accordingly. In general, the advantage to allowing imprecise exceptions is increased speed of execution in the pipelined data units, while the disadvantage is the greatly increased difficulty (or impossibility) of recovering from the trap condition using "smart" trap software.

One proposed technique for overcoming the disadvantage of allowing imprecise exceptions is to allow each instruction to cause "temporary" changes of state which will become permanent only if all instructions preceeding that instruction in the instruction stream successfully complete execution, but which will be "undone" otherwise. However, the hardware necessary to "remember" all of the "temporary" changes of state and to keep track of the instruction stream dependencies is quite extensive.

It would be desirable to provide a hardware-efficient technique whereby sufficient information would be readily available as of the time an imprecise exception is detected to enable the trapping instruction to be completed, if possible, in either hardware or software, or, in the alternative, that the information that is readily available is sufficient to allow the trapped instruction to be recovered.

SUMMARY OF THE INVENTION

Accordingly, a primary object of the present invention is to provide a method and apparatus for maintaining sufficient information about an instruction, including its input operands, as it enters a pipelined data unit to enable the instruction to be completed in the event that the instruction causes a precise exception.

Another object of the present invention is to provide a method and apparatus for maintaining sufficient information about an instruction and its status as it progresses through a pipelined data unit to enable the instruction to be completed in the event that the instruction causes an imprecise exception.

Yet another object of the present invention is to provide an efficient method and apparatus for providing ready access to sufficient information about an instruction as it progresses through a pipelined data unit to enable the instruction to be completed in the event that that instruction causes either a precise or an imprecise exception.

These and other objects and advantages of the present invention are achieved in a pipelined data unit for use in a data processor, the data unit generally comprising an input stage for selectively receiving input operands from the data processor, an operation stage for performing a selected operation on those input operands to produce an output result, and an output stage for selectively providing that output result to the data processor. In accordance with the present invention, the data unit includes precise exception detection logic, associated with the input stage of the data unit, for performing a predetermined input operand test on the input operands, and providing a precise exception signal to the data processor if any of the input operands fails the input operand test; and imprecise exception detection logic, associated with the output stage of the data unit, for performing a predetermined output result test on the output result, and providing an imprecise exception signal to the data processor if the output result fails the output result test. In the preferred form, the data unit also includes precise exception handling logic, associated with the input stage of the data unit, for selectively providing to the data processor the input operands and a precise error indicator that fully characterizes the failure of the input operand test; and imprecise exception handling logic, associated with the output stage of the data unit, for selectively providing to the data processor the output result and an imprecise error signal that fully characterizes the failure of the output result test.

DESCRIPTION OF THE INVENTION

Figure 1:
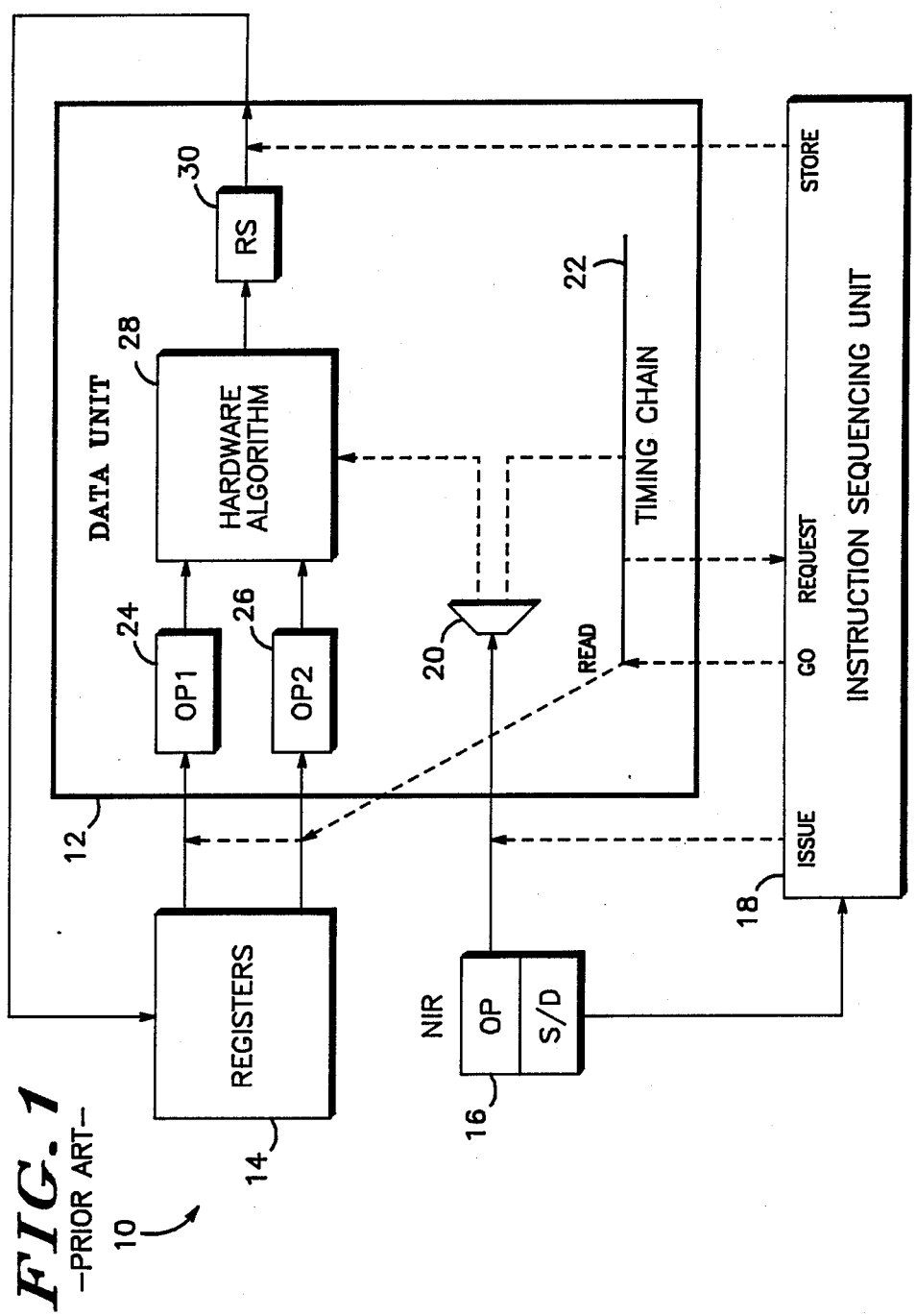
FIG. 1 illustrates in block diagram form a prior art data processor having a pipelined data unit.

Shown in FIG. 1 is a general block diagram of a portion of a prior art data processor 10 including a pipelined data unit 12, a set of operand registers 14, a next instruction register (NIR) 16 and an instruction sequencing unit 18. In general, the processor 10 is similar to the Control Data Corporation 6600, with the data unit 12 being representative of the form of data unit in the 6600. In operation, the instruction sequencer 18 will assert an ISSUE signal to initiate the transfer of the operation code (OP) portion of the instruction in the NIR 16 into a decoder 20 in the data unit 12. When the instruction sequencer 18 determines that the input operands specified by the instruction in the NIR 16 are both available in the respective source (S) registers 14, the instruction sequencer 18 will assert a GO signal to start a timing chain 22 in the data unit 12.

The timing chain 22 will initially assert a READ signal to transfer the input operands from the designated source registers 14 into a pair of input operand buffers (OP1) 24 and (OP2) 26. Once the input operands are latched, a hardware algorithm 28 initiates execution of the specified operation under the control of the decoder 20 and the timing chain 22. Well before the hardware algorithm 28 delivers an output result to a result buffer (RS) 30, the timing chain 22 will assert a RE-QUEST signal to request permission from the instruction sequencer 18 to write the output result into the designated destination (D) register 14. Assuming no register conflict, the instruction sequencer 18 will assert a STORE signal to transfer the output result to the designated destination register 14 as soon as the result is latched in the result buffer 30. Thus, absent conflicts at the beginning or end of the pipeline, the instruction will "flow" through the data unit 12 with no delays.

In the prior art data processor 10 shown in FIG. 1, no hardware was provided to detect either precise or imprecise exceptions. Instead, the responsibility for detecting such exceptions was delegated to the software. Thus, for example, the user program was expected to examine the input operands and intercept improper values before use. Similarly, the user program was expected to examine output results to determine if such conditions as overflow or underflow occurred, and to take such remedial action as may be possible under the circumstances. Often, nothing could be done to recover from the imprecise type of exceptions, and execution of the user program was simply terminated with an appropriate error message.

Figure 2:
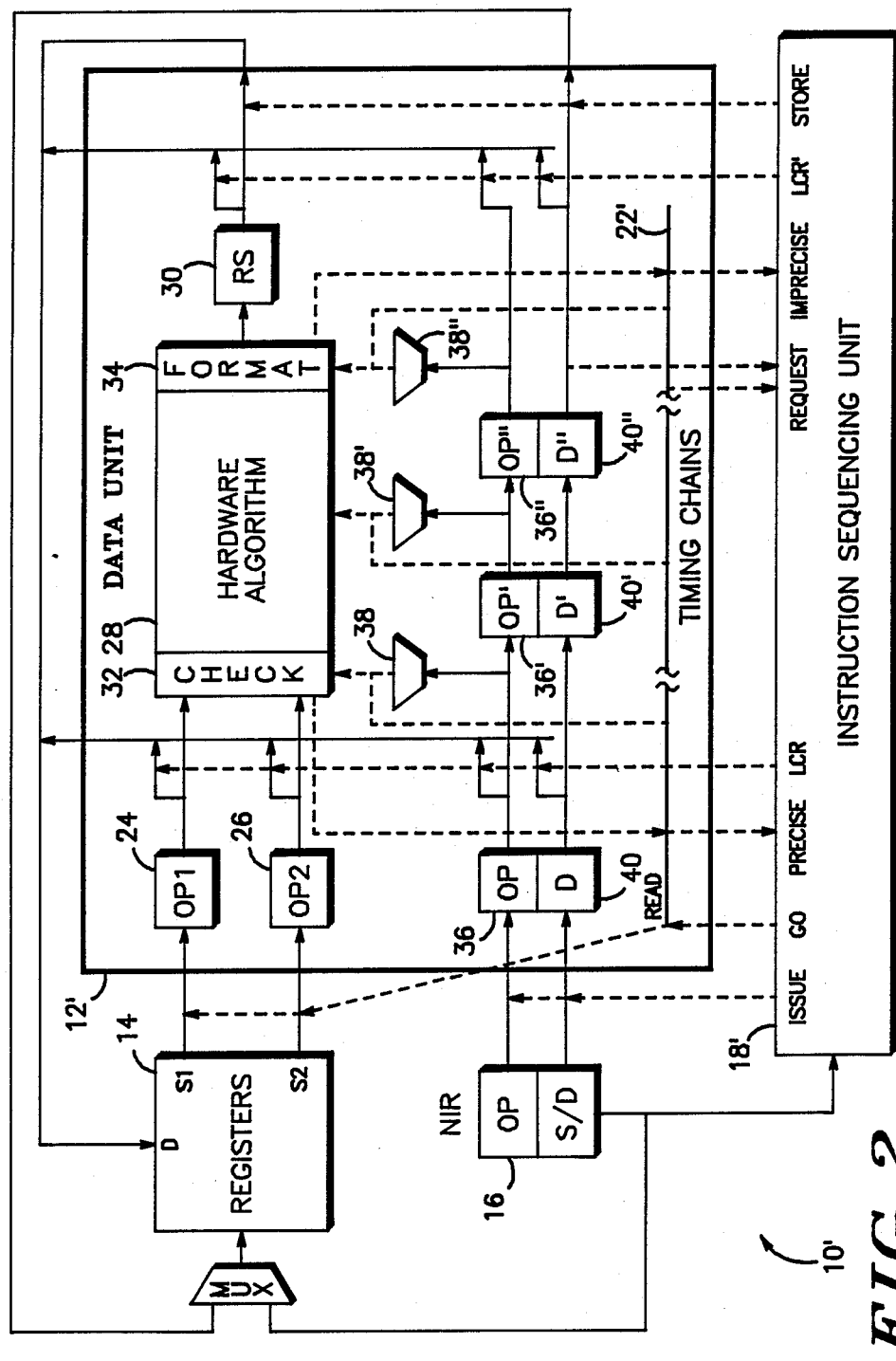
FIG. 2 illustrates in block diagram form a data processor having the pipelined data unit of the present invention.

In the preferred form shown in FIG. 2, the data unit 12' has been "widened", without incurring a time penalty, to include special input operand check logic 32 at the input stage of the pipeline to detect precise exceptions, and output result format logic 34 at the output stage of the pipeline to detect imprecise exceptions. A chain of opcode buffers 36, 36' and 36", with associated decoders 38, 38' and 38", are also provided to retain the operation specification information for the particular instruction at each of the pipeline stages of the data unit 12'.

In the preferred form, a chain of destination designator buffers 40, 40' and 40" are also provided to "remember" the number of the particular destination register 14 that has been designated to receive the result of the instruction being executed at the respective stage of the data unit 12'. This designator is provided to the instruction sequencer 18' at the same time that the REQUEST is made for an opportunity to transfer the result from the result buffer 30 to the designated destination register 14.

If the input operand check logic 32 determines that one or both of the input operands in the input buffers 24–26 are improper for the particular operation specified by the opcode portion of the instruction in the opcode buffer 36, the check logic 32 will assert a PRECISE signal to notify the instruction sequencer 18' of the error. Preferably, the PRECISE signal not only signals the fact that a precise exception was detected, but also the exact nature of the precise exception.

In order to prevent any changes in the state of the processor 10' pending resolution of the precise exception, the PRECISE signal will "halt" the timing chain 22' of the data unit 12'. Simultaneously, all other data units (not shown) in the processor 10' will also halt.

In response to the PRECISE signal, the instruction sequencer 18' will cease to issue further instructions in the present instruction stream, and, instead, will vector in a conventional manner to a special precise exception handling software routine. Upon assuming control of the processor 10', the precise exception handling routine will execute a series of special "load control register" (LCR) instructions to sequentially transfer the current contents of the input operand buffers 24–26, the opcode buffer 36 and the destination designator buffer 40 from the data unit 12' into the registers 14, where they may be readily examined. Depending upon the cause of the precise exception, the precise exception handling routine may be able to simply correct the fault, and allow the processor 10' to resume execution of the user program with the trapped instruction. If recovery is impossible, the precise exception handling routine may simply transfer the input operands and instruction information to system memory, and request the operating system to terminate the user program with the appropriate error message.

If, on the other hand, the output result format logic 34 determines that the output result provided by the hardware algorithm 28 is improper for the particular operation specified by the opcode portion of the instruction in the opcode buffer 36", the format logic 34 will assert an IMPRECISE signal to notify the instruction sequencer unit 18' of the error. In the preferred form, the format logic 34 will simply transfer the "raw" output result into the result buffer 30, so that the maximum amount of result information is available for the recovery. Preferably, the IMPRECISE signal not only signals the fact that an imprecise exception was detected, but also the exact nature of the imprecise exception.

In order to prevent any changes in the state of the processor 10' pending resolution of the imprecise exception, the IMPRECISE signal will "halt" the timing chain 22' of the data unit 12'. However, unlike precise exceptions, the other data units (not shown) in the processor 10' need not also halt.

In response to the IMPRECISE signal, the instruction sequencer 18' will cease to issue further instructions in the present instruction stream, and will vector in a conventional manner to a special imprecise exception handling software routine. Upon assuming control of the processor 10', the imprecise exception handling routine will execute another series of the "load control register" (LCR') instructions to sequentially transfer the current contents of the result buffer 30, the opcode buffer 36" and the destination designator buffer 40" from the data unit 12' into the registers 14, where they may be readily examined. Depending upon the cause of the imprecise exception, the imprecise exception handling routine may be able to adjust the result to compensate for the fault, and allow the processor 10' to resume execution of the user program. If recovery is impossible, the imprecise exception handling routine may simply transfer the input operands and instruction information to system memory, and request the operating system to terminate the user program with the appropriate error message.

Figure 3:
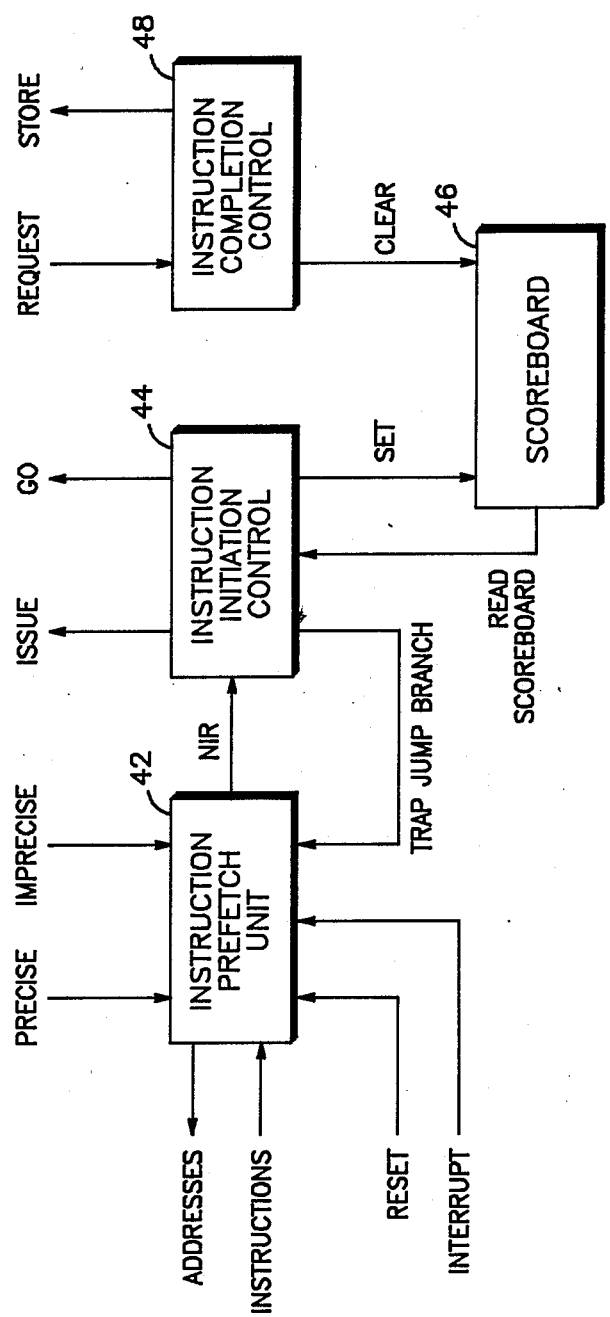
FIG. 3 illustrates in block diagram form the preferred form of the instruction sequencer of the data processor of FIG. 2.

Shown in FIG. 3 is a block diagram of a preferred form of the instruction sequencer unit 18'. In the illustrated form, an instruction prefetch unit 42 maintains a queue of instructions awaiting execution by prefetching instructions in the current instruction stream. If the next instruction is a change of flow, such as a trap, jump or branch, an instruction initiation control unit 44 will signal the instruction prefetch unit 42 to start prefetching from the appropriate target address. An externally generated RESET or INTERRUPT signal will also induce the instruction prefetch unit 42 to start prefetching from a new target address. Similarly, the PRECISE and IMPRECISE signals will induce the instruction prefetch unit 42 to vector to the precise and imprecise exception handling routines, respectively.

When an examination of a register scoreboard 46 indicates that the input operands required for the next instruction are available in the designated source registers 14, the instruction initiation control unit 44 will assert the ISSUE and GO signals. Simultaneously, the instruction initiation control unit 44 will signal the scoreboard 46 to SET the "stale" flag associated with the designated destination register 14. In response to the REQUEST signal from a data unit 12', for example, for an opportunity to transfer a result to the designated destination register 14, an instruction termination control unit 48 will assert the STORE signal at the appropriate time. Simultaneously, the instruction termination control unit 48 will signal the scoreboard 46 to CLEAR the "stale" flag associated with the designated destination register 14.

Figure 4:
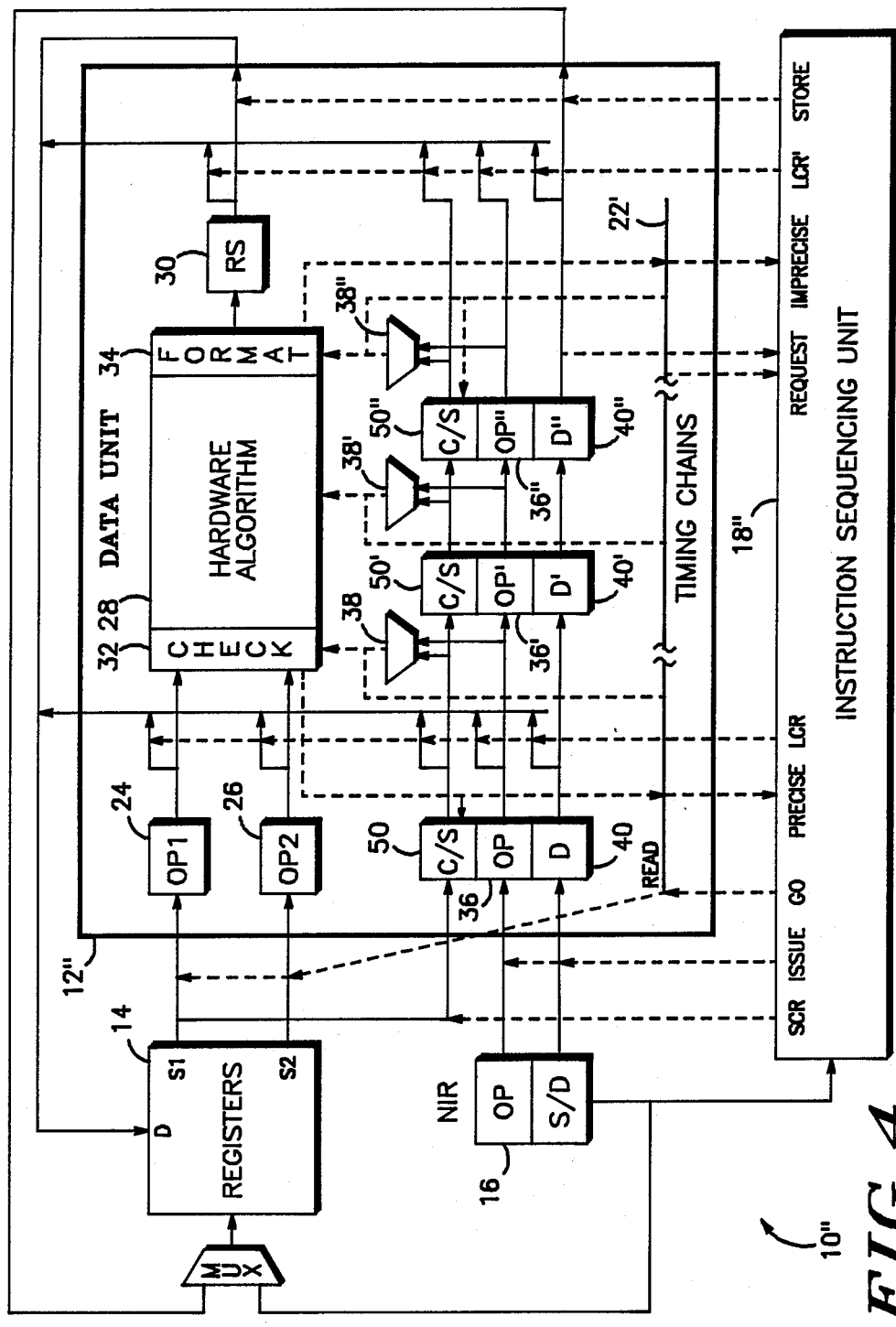
FIG. 4 illustrates in block diagram form a data processor having a modified form of the pipelined data unit of FIG. 2.

In the modified form shown in FIG. 4, a chain of control and status (C/S) buffers 50, 50' and 50" are provided to allow pipeline control and status information to flow through the data unit 12" together with the respective opcode and destination designator information. In general, the control and status buffers 50, 50' and 50" will include control fields for selectively enabling each of the types of exceptions which a particular type of data unit 12" may encounter. For example, separate control fields may be provided to selectively "enable" the recognition of common exceptions such as "invalid operation", "underflow" and "overflow" conditions, and such specific exceptions as "divide by zero". In the preferred form, a special "store control register" (SCR) instruction may be executed to transfer a value, previously loaded into, or "constructed" in, one of the registers 14, from that register 14 into the control and status buffer 50. If a particular type of exception is enabled by having the corresponding control field "set", for example, then the data unit 12" will assert either the PRECISE or IMPRECISE exception signal, as appropriate, when an exception of that type is detected by the input operand check logic 32 or the output result format logic 34, respectively.

Depending upon the type of operations the particular data unit 12" is designed to perform, additional control fields may be provided in the control and status buffers 50, 50' and 50". For example, in a floating-point type of data unit 12", a special field may be provided to select a particular one of the IEEE required rounding modes of the format logic 34. This ability for each instruction to "carry along" its own unique control and status information as it flows through the pipeline effectively allows the data unit 12" to be dynamically reconfigured for each instruction. This is in distinct contrast with the prior art data unit 12 (FIG. 1), which had only a single configuration control register (not shown) and required that the entire pipeline to be "empty" before a change could be made in the configuration of the data unit 12. By providing independent control and status buffers 50, 50' and 50" for each stage of the pipeline, instructions requiring different configurations can simultaneously coexist in the data unit 12", thereby allowing for substantially improved throughput.

If desired, selected fields of the control and status buffers 50, 50' and 50" need not be transferred between stages, when the control information is not required by any of the subsequent stages of the pipeline. However, in the preferred form, all of the control information is preserved through all stages to facilitate recovery in the event of an imprecise exception.

In addition to pipeline control information, the control and status buffers 50, 50' and 50" preferably include a status field for each of the types of exceptions which the data unit 12" may encounter. Thus, for example, the control and status buffers 50, 50' and 50" may include an "invalid operation flag", an "underflow flag", an "overflow flag", and, if appropriate, a "divide by zero flag". If desired, these status flags can be "set" whenever the corresponding exception is detected. However, in the preferred form, these flags are only set when the corresponding type of exception is detected but recognition of that type of exception is disabled by the corresponding exception control field. If multiple exceptions should be detected (and all of the corresponding recognition mechanisms disabled) as an instruction flows through the pipeline, the exception flags will simply "accumulate" in the control and status buffers 50, 50' and 50". If and when appropriate, these accumulated exceptions can be recognized by software, using the "load control register" mechanism described above, and then handled appropriately.

Although the present invention has been described in the context of certain preferred embodiments, various changes, deletions, additions and modifications may be made in those embodiments without departing from the spirit and scope of the invention. For example, although the data processors 10' and 10" have been disclosed as including only single data units 12' and 12", respectively, additional data units (not shown) of similar or different configuration may be included. Similarly, the illustrated data units 12' and 12" may be changed or modified in any of a number of different ways to optimize the performance thereof on particular types of operations. For example, while the data units 12' and 12" are particularly well configured to facilitate efficient execution of floating point operations, only slight modifications would be required to adapt the data units 12' and 12" for highly efficient integer operations, and such changes would not affect the implementations of the present invention as disclosed herein.

What is claimed is:

1. In a pipelined data unit for use in a data processor, the data unit comprising:
   an input stage for selectively receiving input operands from said data processor;
   an operation stage for performing a selected operation on said input operands to produce an output result; and
   an output stage for selectively providing said output result to said data processor;
   the improvement comprising:
   precise exception detection means, in the input stage of the data unit, for performing a predetermined input operand test on said input operands, and selectively providing a precise exception signal to said data processor if any of said input operands fails said input operand test; and
   imprecise exception detection means, in the output stage of the data unit, for performing a predetermined output result test on said output result, and selectively providing an imprecise exception signal to said data processor if said output result fails said output result test.

2. The data unit of claim 1 further comprising:
   precise exception handling means, in the input stage of the data unit, for selectively providing to said data processor said input operands and a precise error indicator that characterizes said failure of said input operand test.

3. The data unit of claim 2 wherein said input stage also receives from said data processor an operation specifier which specifies the selected operation to be performed by said operation stage, and wherein said precise exception handling means also selectively provides said operation specifier to said data processor.

4. The data unit of claim 3 wherein said input stage also receives from said data processor a destination specifier which specifies a destination in said data processor to receive said output result and wherein said precise exception handling means also selectively provides said destination specifier to said data processor.

5. The data unit of claim 2 further comprising:
   imprecise exception handling means, in the output stage of the data unit, for selectively providing to said data processor said output results and an imprecise error signal that characterizes said failure of said output result test.

6. The data unit of claim 1 further comprising:
   imprecise exception handling means, in the output stage of the data unit, for selectively providing to said data processor said output result and an imprecise error signal that characterizes said failure of said output result test.

7. In a pipelined data unit for use in a data processor, the data unit comprising:
   an input stage for selectively receiving input operands from said data processor;
   an operation stage for performing a selected operation on said input operands to produce an output result; and
   an output stage for selectively providing said output result to said data processor;
   the method comprising the steps of:
   performing a predetermined input operand test on said input operands, and selectively providing a precise exception signal to said data processor if any of said input operands fails said input operand test; and
   performing a predetermined output result test on said output result, and selectively providing an imprecise exception signal to said data processor if said output result fails said output result test.

8. The method of claim 7 further comprising the step of:
   selectively providing to said data processor said input operands and a precise error indicator that characterizes said failure of said input operand test.

9. The method of claim 8 wherein said input stage also receives from said data processor an operation specifier which specifies the selected operation to be performed by said operation stage, and wherein said operation specifier is also selectively provided to said data processor.

10. The method of claim 9 wherein said input stage also receives from said data processor a destination specifier which specifies a destination in said data processor to receive said output result and wherein said destination specifier is also selectively provided to said data processor.

11. The method of claim 8 further comprising:
    selectively providing to said data processor said output result and an imprecise error signal that characterizes said failure of said output result test.

12. The method of claim 7 further comprising:

selectively providing to said data processor said output result and an imprecise error signal that characterizes said failure of said output result test.

13. In a data processor, a pipelined data unit comprising:
   an input stage for receiving input operands, performing a predetermined input operand test on said input operands, and providing a precise exception signal if any of said input operands fails said input operand test;
   an operation stage for performing a selected operation on said input operands to produce an output result;
   an output stage for receiving said output result, performing a predetermined output result test on said output result, and providing an imprecise exception signal if said output result fails said output result test; and
   exception handling means for providing selected information to said data processor relating to said exception signals, said exception handling means comprising:
   precise exception handling means for selectively providing to said data processor said input operands and a precise error signal that characterizes said failure of said input operand test; and
   imprecise exception handling means for selectively providing to said data processor said output result and an imprecise error signal that characterizes said failure of said output result test.

* * * * *